(12) United States Patent
Murano et al.

(10) Patent No.: US 9,843,186 B2
(45) Date of Patent: Dec. 12, 2017

(54) POWER TRANSMISSION SYSTEM

(71) Applicant: SION ELECTRIC CO., LTD., Hokkaido (JP)

(72) Inventors: Minoru Murano, Hokkaido (JP); Suminobu Akiba, Hokkaido (JP); Shin Tanahashi, Hokkaido (JP)

(73) Assignee: SION ELECTRIC CO., LTD., Hokkaido (JP)

( * ) Notice: Subject to any disclaimer, the term of this patent is extended or adjusted under 35 U.S.C. 154(b) by 198 days.

(21) Appl. No.: 14/396,238

(22) PCT Filed: Nov. 28, 2013

(86) PCT No.: PCT/JP2013/007004
§ 371 (c)(1),
(2) Date: Oct. 22, 2014

(87) PCT Pub. No.: WO2014/097554
PCT Pub. Date: Jun. 26, 2014

(65) Prior Publication Data
US 2015/0123478 A1    May 7, 2015

(30) Foreign Application Priority Data

Dec. 19, 2012 (JP) ................. 2012-276947

(51) Int. Cl.
*H02J 1/12* (2006.01)
*H02J 1/14* (2006.01)
*H02J 1/10* (2006.01)

(52) U.S. Cl.
CPC ............... *H02J 1/14* (2013.01); *H02J 1/10* (2013.01); *H02J 1/102* (2013.01); *H02J 1/12* (2013.01);
(Continued)

(58) Field of Classification Search
CPC .................... H02J 1/102; H02J 1/12
See application file for complete search history.

(56) References Cited

U.S. PATENT DOCUMENTS 5,677,617 A * 10/1997 Tokai ............... H02M 3/155
  323/222
7,498,694 B2 * 3/2009 Luo ................ H02J 7/0055
  307/43

(Continued)

FOREIGN PATENT DOCUMENTS

JP    11-113188    4/1999
JP    2011-10504   1/2011
(Continued)

OTHER PUBLICATIONS

Ingrid Kohl, "Examples of Applications with the pulse modulator TL5001," Feb. 5, 1998, pp. 1-29.*
(Continued)

*Primary Examiner* — Thienvu Tran
*Assistant Examiner* — Pinping Sun
(74) *Attorney, Agent, or Firm* — Wenderoth, Lind & Ponack, L.L.P.

(57) ABSTRACT

A power transmission system, which has a plurality of DC power sources and a load that receives a supply of DC power, is characterized in that: a power priority retrieving device is attached to each DC power source; control is performed by a controller; and the amount of power to be delivered from a DC power source to which a power priority retrieving device is attached to the load is determined on the basis of the retrieved power priority.

8 Claims, 44 Drawing Sheets

(52) U.S. Cl.
CPC ..... *H02J 2001/106* (2013.01); *Y10T 307/555* (2015.04)

(56) References Cited

U.S. PATENT DOCUMENTS

| | | | | |
|---|---|---|---|---|
| 7,566,980 | B2* | 7/2009 | Fein | F03D 9/007 165/45 |
| 7,701,085 | B2* | 4/2010 | Ito | H02J 3/14 307/29 |
| 7,709,976 | B2* | 5/2010 | Bazinet | H02M 1/10 307/80 |
| 7,960,870 | B2* | 6/2011 | Besser | G05F 1/67 307/151 |
| 8,723,438 | B2* | 5/2014 | Melanson | H02M 1/4225 315/209 R |
| 2007/0273211 | A1* | 11/2007 | Wang | H02J 1/12 307/45 |
| 2008/0122518 | A1* | 5/2008 | Besser | H02J 3/382 327/518 |
| 2010/0231050 | A1* | 9/2010 | Tamaki | H02J 1/102 307/76 |
| 2011/0006600 | A1* | 1/2011 | Fontana | H02J 1/10 307/25 |
| 2011/0125341 | A1* | 5/2011 | Heath | H02J 1/108 700/295 |
| 2012/0313443 | A1* | 12/2012 | Cheng | H02J 3/383 307/82 |
| 2014/0117962 | A1* | 5/2014 | Mao | H02M 3/1582 323/282 |

FOREIGN PATENT DOCUMENTS

| | | |
|---|---|---|
| JP | 2011-97818 | 5/2011 |
| JP | 2011-109783 | 6/2011 |
| WO | 2011/039608 | 4/2011 |
| WO | 2011/058412 | 5/2011 |

OTHER PUBLICATIONS

International Search Report dated Dec. 24, 2013 in corresponding International Application No. PCT/JP2013/007004.

* cited by examiner (A) When voltage on power generation side is lower than voltage on load side (B) When voltage on power generation side is higher than voltage on load side (C) Can be used when voltage on power generation side is lower or higher than voltage on load side Voltage / Power characteristics of solar photovoltaic generation

POWER TRANSMISSION SYSTEM

TECHNICAL FIELD

The present invention relates to an device for power generation by natural energy and a device for controlling the supply of power generated by such a power generation device, and more specifically a power transmission system that varies the amount of power supplied from power sources consisting of a plurality of the power generation devices according to various set conditions and transmits it to a direct current (DC) load side.

BACKGROUND ART

Conventionally, a power source of power to be consumed is generally supplied only from an electric power company, and enough power is supplied such that it is not necessary to select a supply source.

In other words, it has generally been recognized that the power from such an electric power company can meet the power demand for all consumers, and is sufficient enough that there are rarely any power outages.

However, in recent years, due to earthquakes and other accidents, the dangers of relying on only a single power source (for example, a commercial power supply that is supplied by an electric power company) have become apparent.

Accordingly, the use of natural energy such as solar photovoltaic generation has been spreading, but there are many obstacles to using natural energy such as solar photovoltaic generation. For example, in the case of solar photovoltaic generation, a power conditioner (direct current/alternating current converter) is generally used, and if there is an outage in the commercial power source, the operation of such a power conditioner may be stopped considering the safety thereof even if the power generation capacity is sufficient. In order to utilize solar photovoltaic generation during an outage of the commercial power source, for example, consumers must manually set the power conditioner to an autonomous operation mode, but this may be extremely difficult during a disaster.

Further, even during periods of normal supply of the commercial power source, in the case of selling power, if many solar photovoltaic generation facilities are installed, particularly in adjacent regions, the main line voltage may rise. This can cause restrictions to act on the operation of the power conditioner, which has frequently led to cases in which power cannot be sufficiently sold.

Moreover, in addition to power generation by natural energy such as solar power, wind power, and water power, many other power options are becoming available such as fuel cells, co-generation power generation, and utilization of midnight power by batteries. However, there are many conditions on such options, including the costs of such power generation, the utilization of heat generated together with such power, increases in power generation for utilization as a heat source, restrictions on the time period in which such power can be utilized, and the like, and thus technology for satisfying these conditions to effectively utilize such options is needed.

Patent Document 1: JP H11-113188 A

SUMMARY OF INVENTION

The present invention was created in order to overcome the above-described conventional problems, and an objective thereof is to provide a power transmission system which can achieve the following: effectively utilize even small amounts of power generated from few natural energy sources without waste when combining groups of power generated from not only the commercial power source but also from natural energy sources (in power combination of a type utilizing a so-called power conditioner as mentioned above, weak power such as solar photovoltaic generation during cloudy weather was nearly unusable); utilize a plurality of power sources in combination; automatically supply power from another power source when one of the power sources is cut off; easily set a usage priority order for the plurality of power sources and select energy from the most desired power source (for example, preferentially utilize the cheapest energy, etc.); and comprehensively utilize power without waste in compliance with various conditions depending on the type of power source, such as expensive power sources like in-house power generators and fuel cells, power sources which simultaneously produce power and heat as in co-generation power generation (wherein the amount of power generation changes due to changes in the demand for heat and hot water), and utilizing midnight power by storing it in a battery (which has restrictions on the usage time and capacity) (specifically, arbitrarily set the amount of power supplied from various power generation sources or deliberately control the amount of power generated).

Further, as a technology related to the present invention, there is a technology for combining power using a diode (backflow prevention circuit). In this method, the priority order of the power sources can be set by changing the voltage, but when a so-called backflow prevention diode is used, there has been a problem in that a portion of the power is lost as heat when a current flows to the diode. However, in the present invention, a backflow prevention diode is not necessary for combining power, and thus the present invention can realize an extremely efficient power transmission system from this perspective as well.

The power transmission system according to the present invention is a power transmission system including a plurality of DC power sources and a load that receives a supply of DC power from the plurality of DC power sources, characterized in that a power priority retrieving device is attached to the DC power sources, the attached power priority retrieving device is controlled by a controller, and the amount of power to be supplied to the load from the DC power sources to which the power priority retrieving device is attached is determined on the basis of the retrieved power priority; or a power transmission system including a plurality of DC power sources and a load that receives a supply of DC power from the plurality of DC power sources, characterized in that a power priority retrieving device is attached to each DC power source, the power priority retrieving devices are controlled by a controller provided to each power priority retrieving device, and the amount of power to be supplied to the load from each of the plurality of DC power sources to which the power priority retrieving devices are attached is determined on the basis of the retrieved power priority;

or characterized in that an output-side current value of the power priority retrieving device is detected, and a maximum efficiency power generation amount at that time can be determined for the power generation amount of a solar photovoltaic power generation device, which is one energy source to which the power priority retrieval device is attached; or characterized in that the power priority retrieval device is configured to include a capacitor.

According to the present invention, the following can be achieved: effectively utilize even small amounts of power generated from few natural energy sources without waste when combining and transmitting groups of power generated from not only the commercial power source but also from natural energy sources (in power combination of a type utilizing a so-called power conditioner as mentioned above, weak power such as solar photovoltaic generation during cloudy weather was nearly unusable); utilize a plurality of power sources in combination; automatically supply power from another power source when one of the power sources is cut off; easily set a usage priority order for the plurality of power sources and select energy from a desired power source when utilize a plurality of power sources (for example, preferentially utilize the cheapest energy, compensate only an insufficient portion with the commercial power source, or preferentially utilize environmentally friendly energy); and utilize power without waste in compliance with various conditions depending on the type of power source, such as expensive power sources like in-house power generators and fuel cells, power sources which simultaneously produce power and heat as in co-generation power generation (wherein the amount of power generation changes due to changes in the demand for heat and hot water), and utilizing midnight power by storing it in a battery (which has restrictions on the usage time and capacity) (specifically, arbitrarily set the amount of power supplied from various power generation sources or deliberately control the amount of power generated). Further, there is a technology for combining power using a diode (backflow prevention circuit), and in this method, the priority order of the power sources can be set by changing the voltage, but when a diode is used, there has been a problem in that a portion of the power is lost as heat when a current flows to the diode. However, in the present invention, a diode is not necessary for combining power, and thus the present invention achieves a superior effect in that it can realize an extremely efficient power transmission system.

DESCRIPTION OF EMBODIMENTS

An embodiment of the present invention will now be explained below with reference to the drawings.

Figure 1:
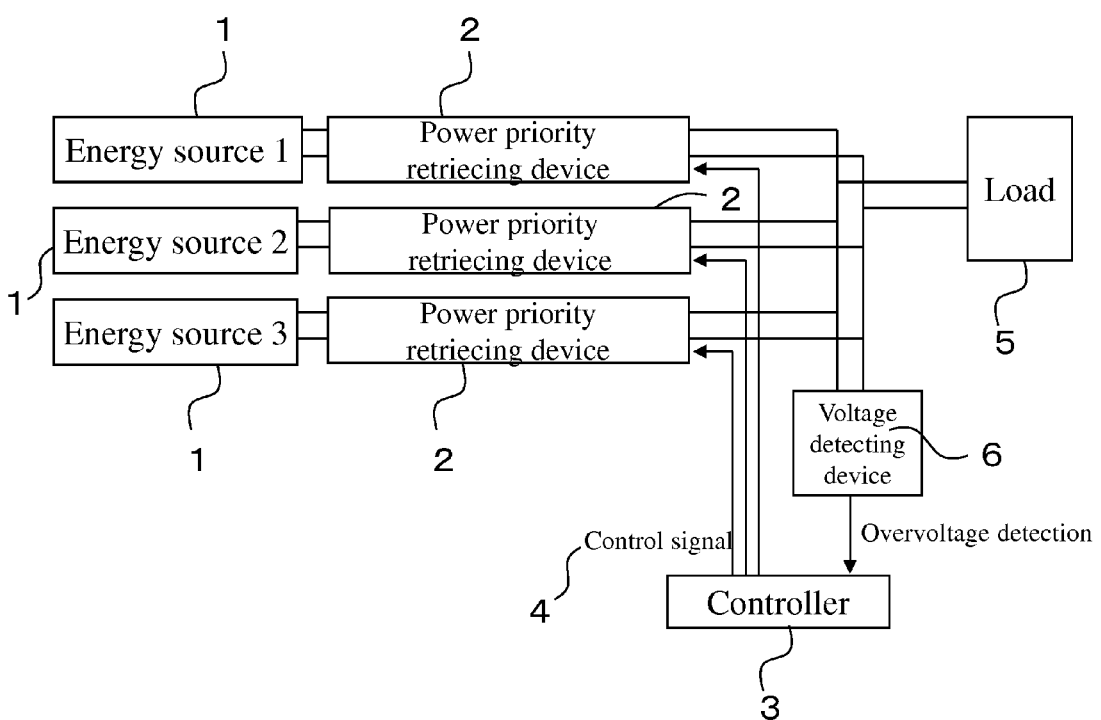
FIG. 1 is a schematic configuration explanatory view (1) illustrating a schematic configuration of the present invention.

FIG. 1 is a configuration explanatory view explaining a schematic configuration of a power transmission system according to the present invention. In FIG. 1, each reference numeral 1 indicates an energy source. Herein, in this embodiment, an example is illustrated in which there are three energy sources 1 . . . , but the power transmission system can be configured as long as there is at least one energy source 1 . . . (if there is only one energy source 1, it is equivalent to a normal power source because it is not necessary to combine power sources).

Herein, the energy sources 1 represent various power generation devices, and particularly power generation devices utilizing natural energy (generators for solar photovoltaic generation, wind power generation, water power generation, and the like), but the energy sources 1 are not limited thereto. As long as it can be converted to direct current (DC), any energy source 1 . . . other than the above-mentioned energy sources 1 . . . can be used.

Therefore, a commercial power source can be rectified to direct current for use as an energy source 1. Also, a battery can be used as an energy source 1 shown in FIG. 1. Using a battery enables energy shift in which the battery is charged with midnight power and this power stored in the battery is supplied during the day when power is insufficient or electricity costs increase.

Each reference numeral 2 indicates a power priority retrieving device. Each power priority retrieving device 2 is a device for receiving power from an energy source 1 . . . and transmitting an appropriate amount of power from the energy source 1 . . . to a load 5 in accordance with a control signal 4 from a controller 3 with good cost performance. The output amount of power to be transmitted from each energy source 1 . . . to the load 5 is determined upon control by the control signal 4 from the controller 3. The details thereof will be explained below.

Herein, the controller 3 is a circuit for generating the control signal 4, and it also executes a process for restricting the control signal 4 during overvoltage. The controller 3 can be constituted with an electronic circuit or the like combining a microcomputer and a microcontroller, a comparator, an oscillating circuit, etc.

As the control signal 4, for example, a pulse by PWM (pulse width modulation) can be used, and in this case, the output amount can be represented by a pulse width ratio.

Figure 2:
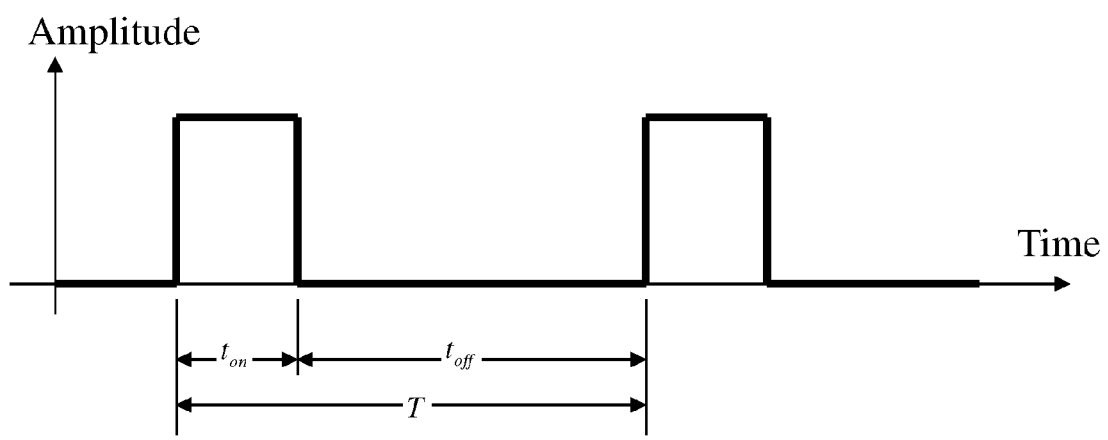
FIG. 2 is an explanatory view illustrating one concrete example of a control signal.

In other words, as can be understood from FIG. 2, the amount of power to be transmitted can be determined by a ratio of a time $t_{on}$ during which the control signal 4 is "1" and a time $t_{off}$ during which the control signal 4 is "0" over a time T of one period.

A voltage detecting device 6 (voltmeter) monitors a voltage of power that is supplied to the load 5. If the supply of power from the energy sources 1 . . . is large and the load 5 is small, or if an output voltage rises in an approach in which one of the power priority retrieving devices 2 is omitted as will be explained later, the voltage detecting device 6 monitors such that the output voltage does not exceed an allowable voltage upper limit.

If the output voltage exceeds the allowable voltage upper limit (according to the specifications of the power source, or the conditions of the load, etc.) (if an overvoltage is detected), the power supplied from the energy sources 1 . . . is decreased by the control signal 4.

Figure 3:
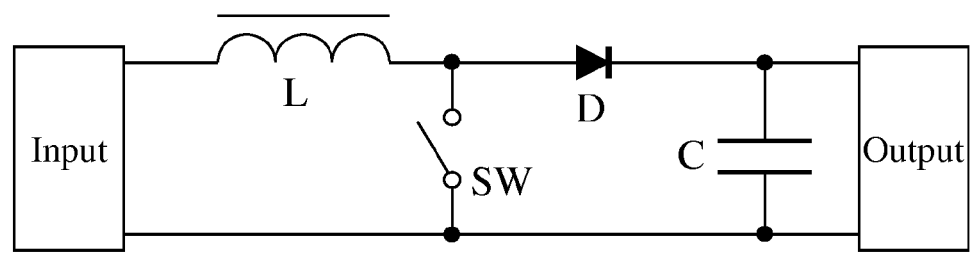
FIG. 3 is an explanatory view (1) illustrating an embodiment of a power priority retrieving device.

Next, the constitution of the power priority retrieving devices 2 will be explained. As shown in FIG. 3, the power priority retrieving devices 2 can be constituted by, for example, a device in which a step-up chopper control circuit by PWM is installed.

In FIG. 3, L indicates an inductance (coil), and D indicates a diode. Instead of the diode D, a member having a rectifying action can be used. In other words, instead of the diode D, a switch (a switch that can be controlled by an external signal such as a semiconductor switch that operates at high speed like a FET or IGBT) can be controlled so that the current does not flow in the reverse direction.

Herein, the energy transmitted to the output side is adjusted by generating the control signal 4 in which the ratio of the time $t_{on}$ during which the control signal 4 is "1" and the time $t_{off}$ during which the control signal 4 is "0" during one pulse is adjusted and then switching the switch SW ON/OFF according to the control signal 4.

Figure 4:
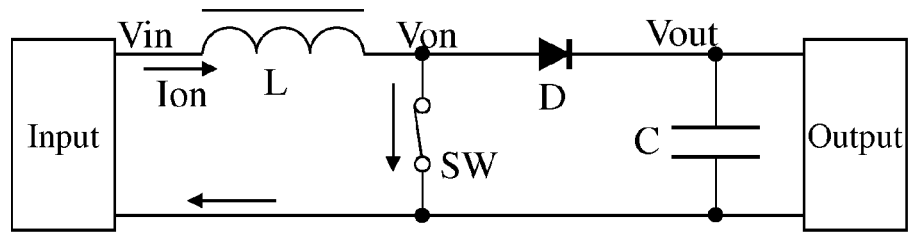
FIG. 4 is an explanatory view (2) illustrating an embodiment of the power priority retrieving device.

First, as shown in FIG. 4, when the switch SW is switched ON, Von becomes 0V, and the current from the input flows toward $I_{on}$.

In general, if a current I flowing to the inductance L changes, an induced electromotive force E is generated, and this is represented by the following equation:

$$E = L\frac{dI}{dt}. \quad \text{(Equation 1)}$$

When the switch SW is switched ON, the voltage applied to the inductance L becomes $V_{in}$. When the current flowing through L at this time is $I_{on}$, Equation 1 becomes:

$$Vin = L\frac{dIon}{dt}. \quad \text{(Equation 2)}$$

When mutated for $I_{on}$, it becomes:

$$dIon = \frac{Vin}{L}dt. \quad \text{(Equation 3)}$$

When both sides are integrated with time t, it becomes:

$$Ion = \frac{Vin}{L}t + I_0, \quad \text{(Equation 4)}$$

with the proviso that $I_0$ is the value of $I_{on}$ when t=0.

Figure 5:
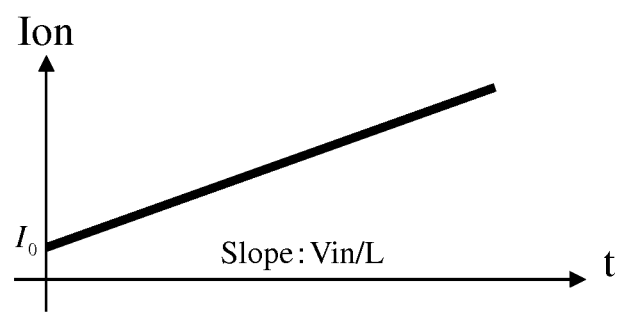
FIG. 5 is an explanatory view explaining the relationship between t and $I_{on}$ with a graph.

FIG. 5 illustrates the relationship between t and $I_{on}$ in graph form.

The time during which the switch SW is ON is sufficiently short, and the inductance L is not saturated within this time.

Figure 6:
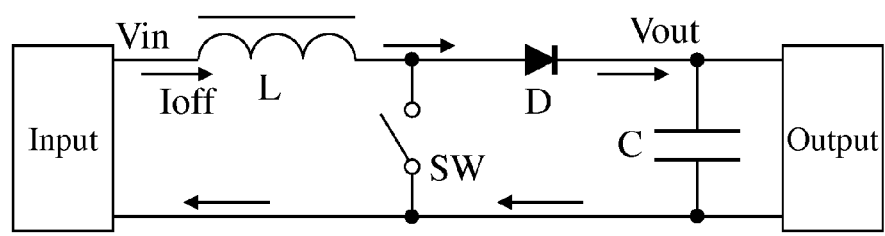
FIG. 6 is an operational explanatory view (1) of the power priority retrieving device.

Next, as shown in FIG. 6, the switch SW is switched OFF.

At this time, the current flows in the output direction, but a sufficiently large condenser C exists, and if the voltage of the condenser C was $V_{out}$, then the voltage is restricted to $V_{out}$.

Since the output voltage is $V_{out}$, the voltage at both ends of the inductance L is $V_{in}-V_{out}$. Therefore, from Equation 1, the relationship with the current $I_{off}$ flowing to the inductance L is expressed with the following differential equation:

$$Vin - Vout = L\frac{dIoff}{dt}. \quad \text{(Equation 5)}$$

When mutated, it becomes:

$$dIoff = \frac{Vin - Vout}{L} = dt. \quad \text{(Equation 6)}$$

When both sides are integrated with time t, it becomes:

$$Ioff = \frac{Vin - Vout}{L}t + I_1. \quad \text{(Equation 7)}$$

$I_1$ is an integration constant, and is the value of the current $I_{off}$ at t=0.

Figure 7:
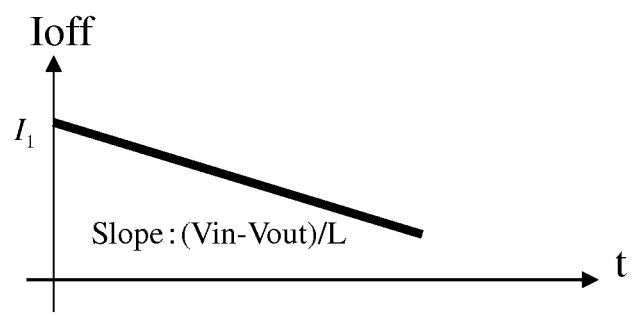
FIG. 7 is an explanatory view explaining "$I_{off}$" shown in Equation 7 with a graph.

FIG. 7 illustrates "$I_{off}$" shown in Equation 7 in graph form.

Due to the properties of L, the current value is continuous, and thus the current value at the instant the switch SW is switched OFF is equivalent to the current value immediately before the switch SW is switched OFF.

Figure 8:
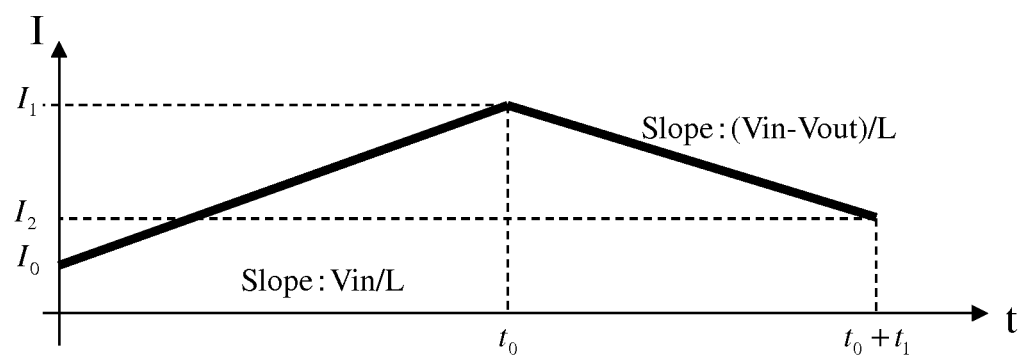
FIG. 8 is an explanatory view explaining a cycle from ON to OFF of the switch SW with a graph.

Thus, given the above, a cycle from when the switch SW is switched ON until it is switched OFF is constituted as shown in FIG. 8. In FIG. 8, from the first current value $I_0$, the switch SW is switched OFF after time $t_0$, and the current value at the instant that it is switched OFF is calculated from Equation 4 as follows:

$$\frac{Vin}{L}t_0 + I_0$$

If this instant is regarded as t=0 of Equation 7, the current value is equivalent to $I_1$, and thus:

$$I_1 = \frac{Vin}{L}t_0 + I_0. \quad \text{(Equation A)}$$

From this state, if the current value when the time has passed $t_1$ is $I_2$, $I_2$ is calculated as follows from Equation 7:

$$I_2 = \frac{V_{in} - V_{out}}{L}t_1 + I_1$$
$$= \frac{V_{in} - V_{out}}{L}t_1 + \left(\frac{V_{in}}{L}t_0 + I_0\right)$$
$$= \frac{V_{in}t_0 + (V_{in} - V_{out})t_1}{L} + I_0$$

If the switch SW is repeatedly switched ON/OFF, $I_2$ becomes the initial value of the current of the next cycle.

Herein, a change in the current over one cycle looks as follows:

$$I_2 - I_0 = \frac{V_{in}t_0 + (V_{in} - V_{out})t_1}{L}. \quad \text{(Equation B)}$$

Figure 9:
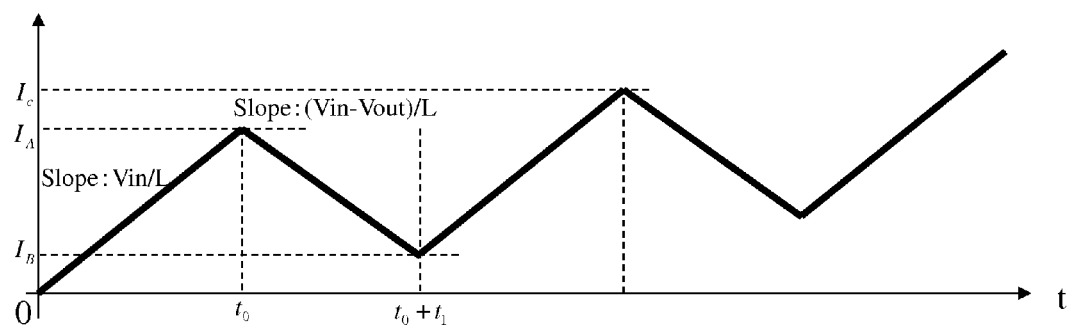
FIG. 9 is an explanatory view explaining a current that flows through an inductance L when the switch SW is repeatedly switched ON/OFF.

If the switch SW is repeatedly switched ON/OFF, the current flowing through the inductance L is represented as shown in FIG. 9.

In FIG. 9, if the current value at time 0 is 0, the current value at time $t_0$ is $I_A$, and the current value at time $t_0+t_1$ is $I_B$, $I_A$ and $I_B$ are as follows:

$$I_A = \frac{V_{in}}{L}t_0 + 0 = \frac{V_{in}}{L}t_0$$
$$I_B = \frac{V_{in} - V_{out}}{L}t_1 + I_A$$
$$= \frac{V_{in}t_0 + (V_{in} - V_{out})t_1}{L}$$

Figure 10:
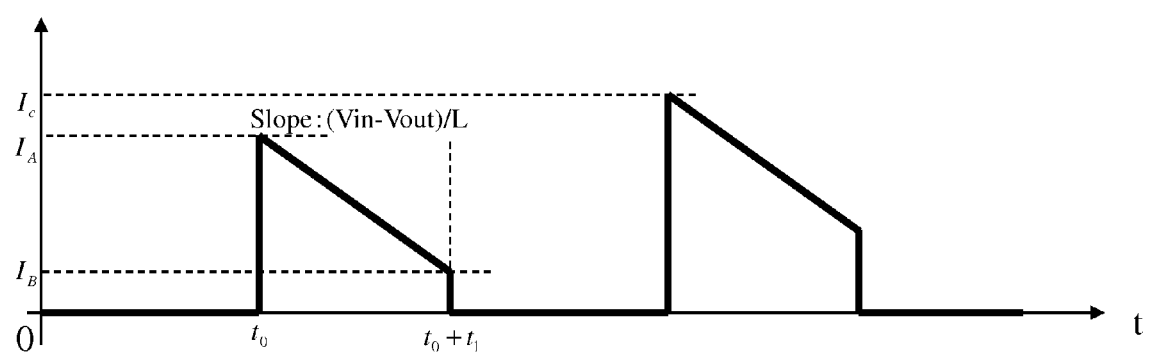
FIG. 10 is an explanatory view explaining a current that flows to an output side through a diode D.

Therein, the current flowing to the output side through the diode D can be represented as shown in FIG. 10.

If a power P supplied to the output is considered in terms of an average over one period, P is calculated as follows:

$$P = V_{out}\frac{I_A + I_B}{2}. \quad \text{(Equation 9)}$$

It can be understood that since the current changes only as indicated in Equation B during each repeat of the cycle, the power also changes proportional to this amount.

Figure 11:
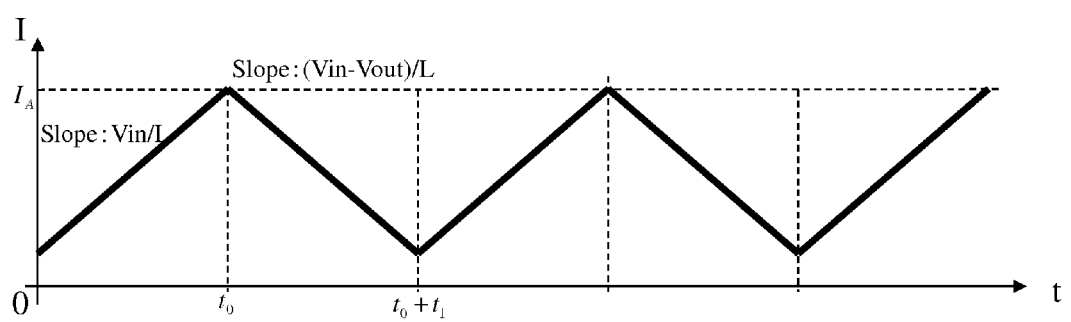
FIG. 11 is an explanatory view (1) explaining a current in each cycle.

In Equation B, when:

$$V_{in}t_0 + (V_{in} - V_{out})t_1 = 0$$

a zigzag line is formed as shown in FIG. 11, and it can be understood that the current does not change in each cycle.

Figure 12:
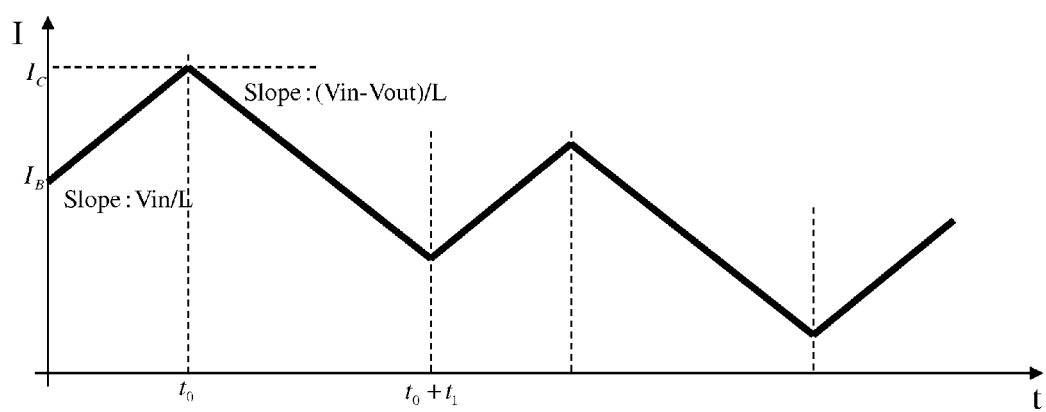
FIG. 12 is an explanatory view (2) explaining a current in each cycle.

Also, when, $$V_{in}t_0 + (V_{in} - V_{out})t_1 < 0$$

a zigzag line is formed as shown in FIG. 12, and it can be understood that the current decreases in each cycle.

Figure 13:
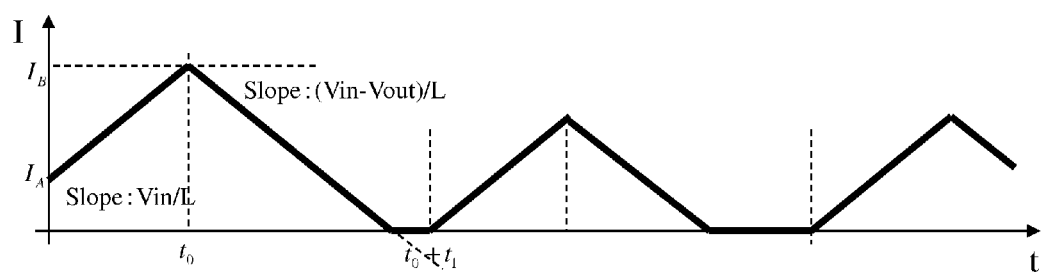
FIG. 13 is an explanatory view (3) explaining a current in each cycle.

If this state continues, the calculated current value will become negative. However, since a reverse current does not flow to D, it actually becomes 0, and the current starts from 0 in the next cycle ($I_0$=0 in Equation 4; refer to FIG. 13).

Given the above, if $V_{in}$ and $V_{out}$ are constant, an increase/decrease of the current to the output can be controlled by the ratio of to and $t_1$. In other words, it can be understood that an increase/decrease of the power supplied to the output can be controlled by the ratio of to and $t_1$.

As discussed above, to and $t_1$ indicate the ON time and the OFF time of the switch SW, and the ratio of the ON time and the OFF time of the switch SW is controlled by the control signal 4 from the controller 3 (microcomputer, etc.).

Figure 14:
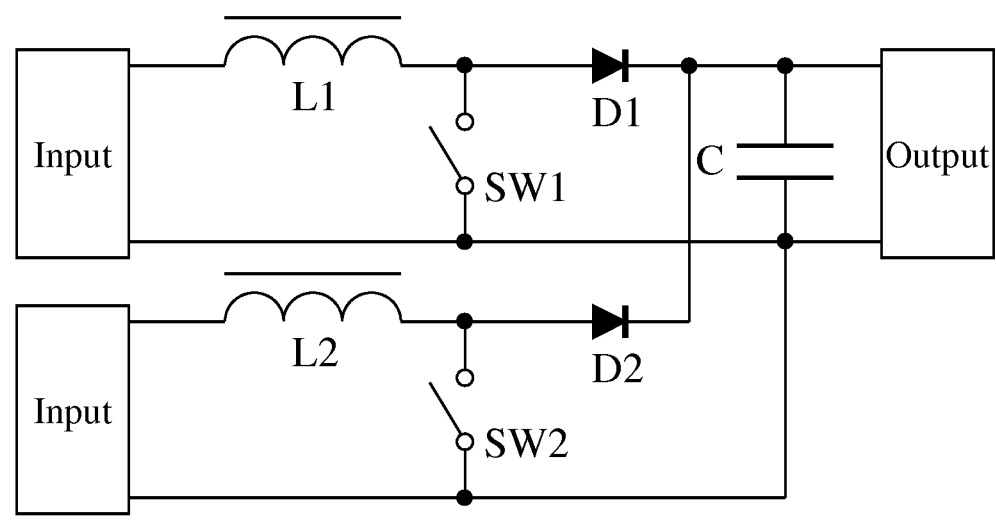
FIG. 14 is an explanatory view explaining a state in which the outputs of a plurality of the power priority retrieving devices are connected in parallel.

Herein, as shown in FIG. 14, the outputs of the plurality of power priority retrieving devices 2 . . . can be connected in parallel.

In a general constant voltage power source circuit, feedback is applied by the voltage, and thus if the outputs of the plurality of power sources are directly coupled, the feedbacks of the plurality of power sources collide and the operation becomes unstable. However, in the present invention, the voltage is not controlled, and thus there is no effect on the power control even if the plurality of power priority retrieving devices 2 . . . are connected.

As can be understood from FIG. 14, the condenser C of the output can be shared. Supposing that the voltages at both ends of the condenser C are constant, each power priority retrieving device 2, 2 can be thought of independently as described above, and an arbitrary amount of power can be supplied from each input by adjusting the ON/OFF time of the switch SW1 and the switch SW2 respectively.

The power priority retrieving devices 2 are normally provided with a so-called backflow prevention diode so that the current does not backflow. For example, refer to FIGS. 3 and 14. However, if there is a forward voltage drop and a large current flows to the diode D, the loss caused thereby is also large. For example, if a forward voltage drop causes a 10 A current to flow to a 1V diode, 10 W power is lost.

Thus, in order to prevent losses due to such forward voltage, a switch element with a low ON resistance such as a FET can be used. For example, if a FET with an ON resistance of 10 mΩ is used, the power lost when 10 A current flows is only 1 W.

Figure 15:
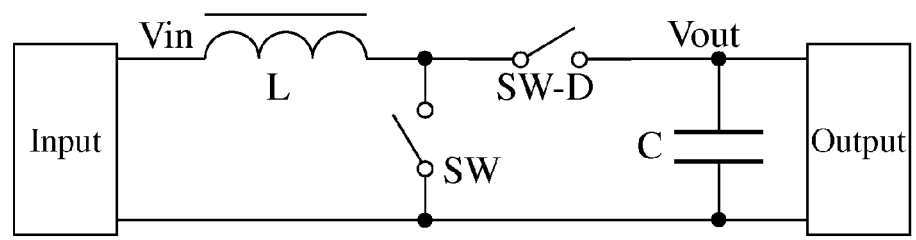
FIG. 15 is an explanatory view explaining the constitution of another embodiment of the power priority retrieving device.

Instead of the diode D shown in FIGS. 3 and 4, a switch element capable of preventing backflow can be used. If a switch element is used, the circuit of the diode D in FIGS. 3 and 4 becomes as illustrated in FIG. 15. In FIG. 15, while the switch SW is switched ON, the switch SW-D is switched OFF, and while the switch SW is switched OFF, the switch SW-D is switched ON. Thereby, an operation equivalent to that of the diode can be carried out. Also, losses can be reduced because forward voltage like that of the diode is not generated. (Losses due to resistance in the switches and the ON/OFF timing do occur, but they are extremely small compared to the losses caused by the diode.)

It goes without saying that the diodes D1 and D2 in FIG. 14 can be also modified to switch elements capable of preventing backflow.

Figure 16:
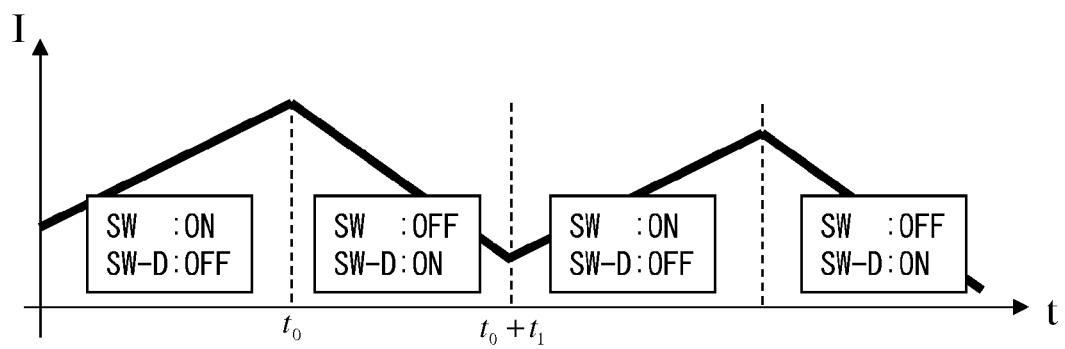
FIG. 16 is an explanatory view explaining an ON/OFF timing of the switch SW and a switch SW-D.

Herein, the ON/OFF timing of the switch SW and the switch SW-D is as shown in FIG. 16.

When SW is OFF and SW-D is ON, the current $I_{off}$ is represented by the following equation.

$$I_{off} = \frac{Vin - Vout}{L}t + I_1$$

(wherein the current at the time SW is switched OFF is $I_1$).

Figure 17:
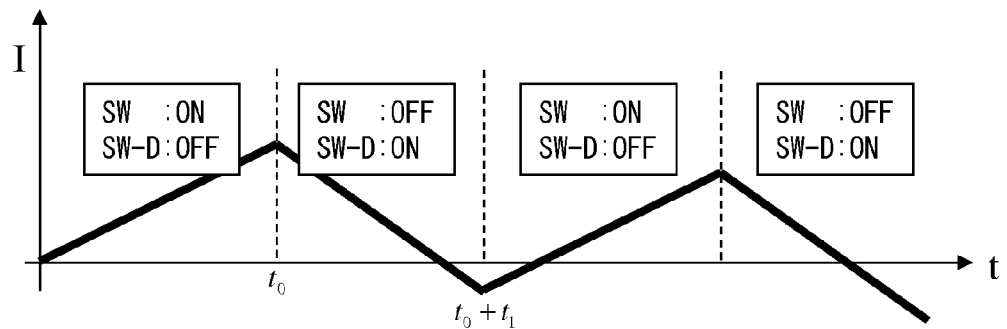
FIG. 17 is an explanatory view (1) explaining a relationship among the switch SW and the switch SW-D and the current.
Figure 18:
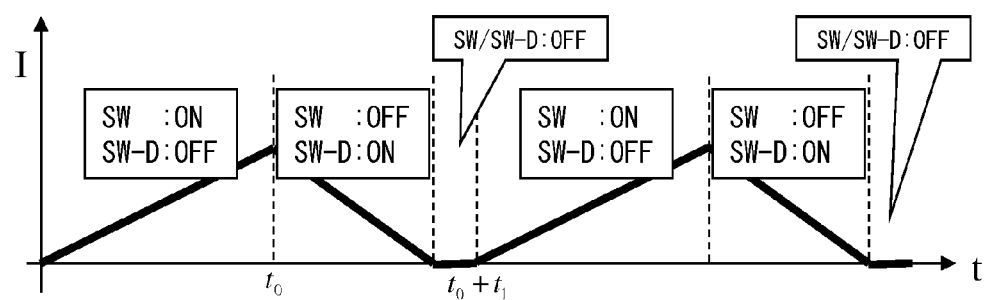
FIG. 18 is an explanatory view (2) explaining a relationship among the switch SW and the switch SW-D and the current.

When $V_{in} < V_{out}$, if $I_1$ decreases, then the current $I_{off} < 0$ after a fixed time (time at which:

$$t = \frac{I_1 L}{Vout - Vin}),$$

and a reverse current flows (FIG. 17).

In order to prevent this, SW-D should be switched OFF at the time at which I=0 (the time at which:

$$t = \frac{I_1 L}{Vout - Vin})$$

(FIG. 18).

Figure 19:
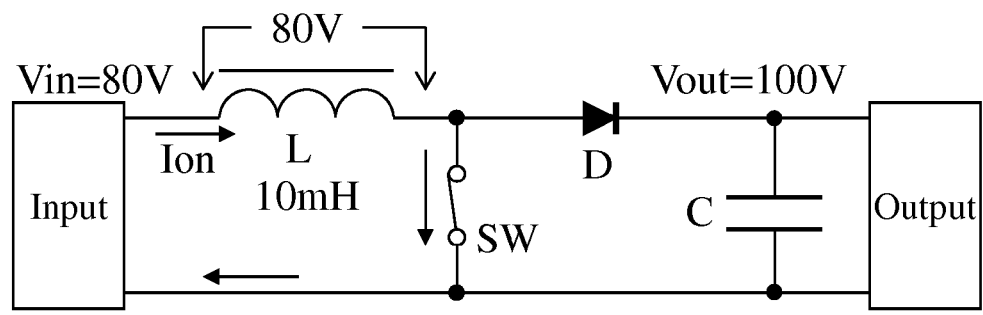
FIG. 19 is an explanatory view (1) explaining a specific operation of the power priority retrieving device.

Next, a concrete embodiment of the power transmission system according to the present invention will be explained referring to FIGS. 19 and 20 while presenting specific numerical values.

The inductance L is set to 10 mH, the input voltage $V_{in}$=80V, and the output voltage $V_{out}$=100V.

When the switch SW is switched ON (FIG. 19), the voltages at both ends of L are 80V.

The current at this time is calculated from Equation 4 as follows:

$$Ion(A) = \frac{80(V)}{10 \times 10^{-3}(H)}t(\sec) + I_0 \qquad \text{(Equation 10)}$$

Figure 20:
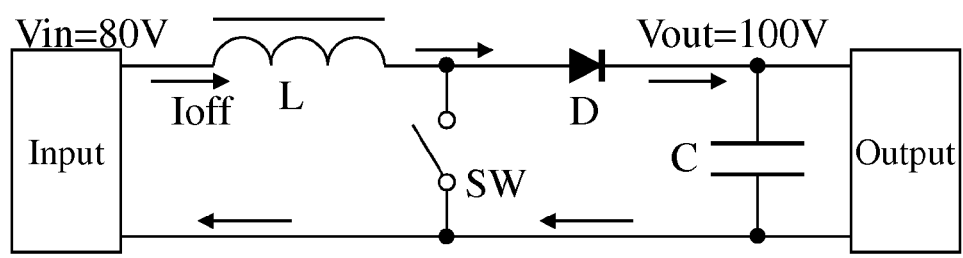
FIG. 20 is an explanatory view (2) explaining a specific operation of the power priority retrieving device.

The switch SW is switched OFF when time $t=t_0$ (refer to FIG. 20).

The current at this time is calculated from Equation 7 as follows:

$$Ioff(A) = \frac{-20(V)}{10 \times 10^{-3}(H)}t(\sec) + I_1 \qquad \text{(Equation 11)}$$

Figure 21:
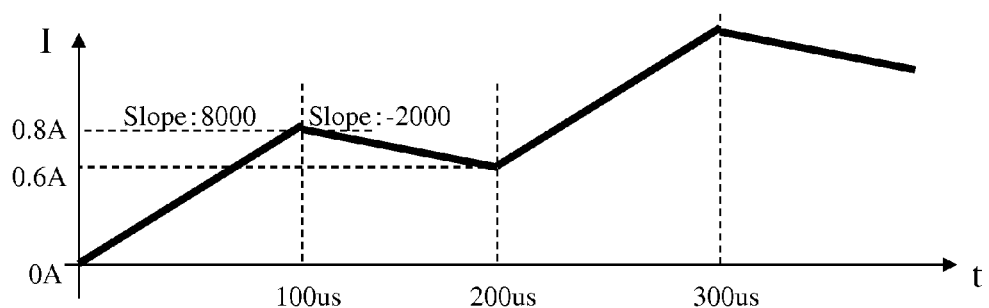
FIG. 21 is an explanatory view explaining a current that flows through the inductance L when the switch SW is switched ON/OFF every 100 microseconds (μs)

If the switch SW is switched ON/OFF every 100 μs, the current flowing through the inductance L is as represented in FIG. 21.

Figure 22:
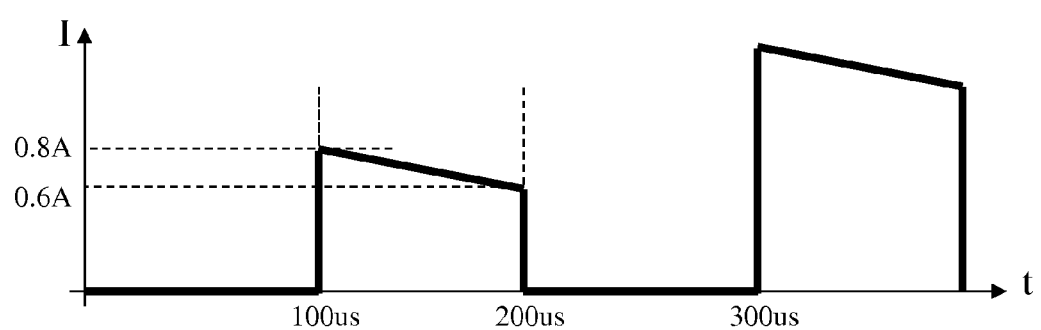
FIG. 22 is an explanatory view explaining a power supplied to a load during FIG. 21.

At this time, the power supplied to the load is as represented in FIG. 22.

In this embodiment, it can be understood that the current increases in every cycle. In other words, it can be understood that the power transmitted to the load side (output side) increases.

Thus, it can be understood that the increase in power supplied to the output is as follows: 0.6 A×100V=60 W increase in power per 1 cycle (every 200 μs).

In the case that the load voltage does not change, in the above-described state, or in other words the state of the switch SW ON/OFF time ratio shown in FIG. 20, the power supplied to the output continuously increases.

Therefore, in order to stop this increase and obtain a constant power supply state, the switch SW ON/OFF time is adjusted. For example, the ON/OFF time of the switch SW is adjusted by lengthening the OFF time. By adjusting in this way, the above-described increase can be stopped and a constant power supply state can be obtained.

Figure 23:
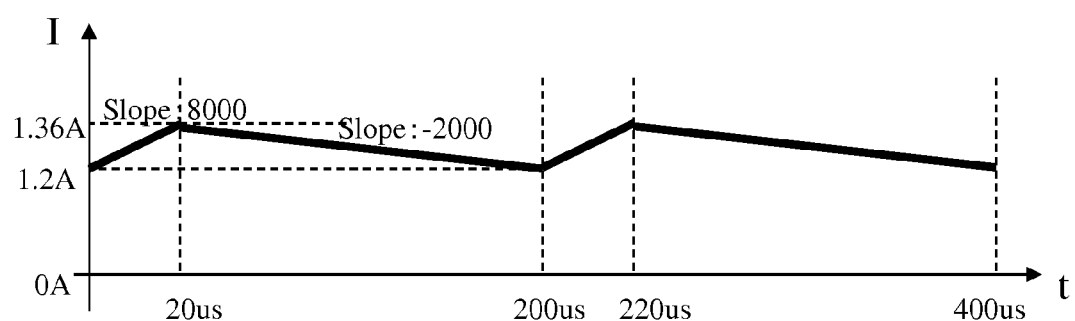
FIG. 23 is an explanatory view explaining a case in which the switch SW is switched ON for 20 μs and then switched OFF for 180 μs.
Figure 24:
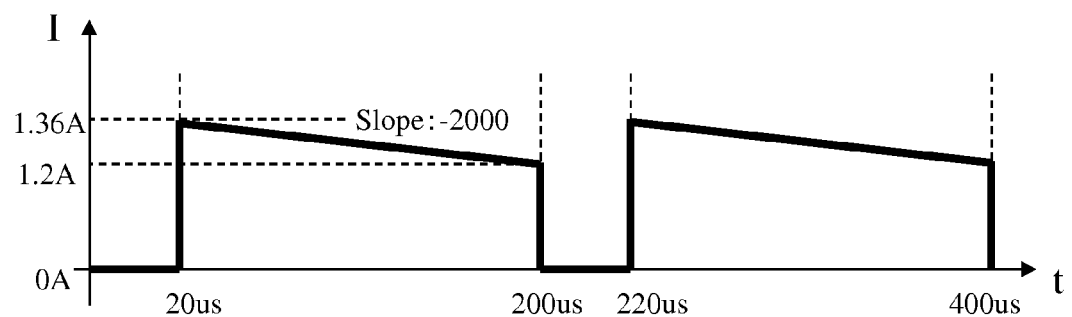
FIG. 24 is an explanatory view explaining a current supplied to an output during FIG. 23.

Specifically, if the switch SW is set to be ON for 20 μs and OFF for 180 μs, the state becomes as shown in FIG. 23, and the current supplied to the output changes as shown in FIG. 24.

At this time, the output current does not change in each cycle, and a constant power is output. If the ratio of the ON time is decreased further, the output power can be controlled to decrease in each cycle.

In this embodiment, a so-called step-up chopper control circuit (boost converter) was used. However, power control such that power priority retrieval can be similarly achieved is also possible with a so-called step-down chopper control circuit (buck converter) or a flyback-type chopper control circuit.

Figure 25:
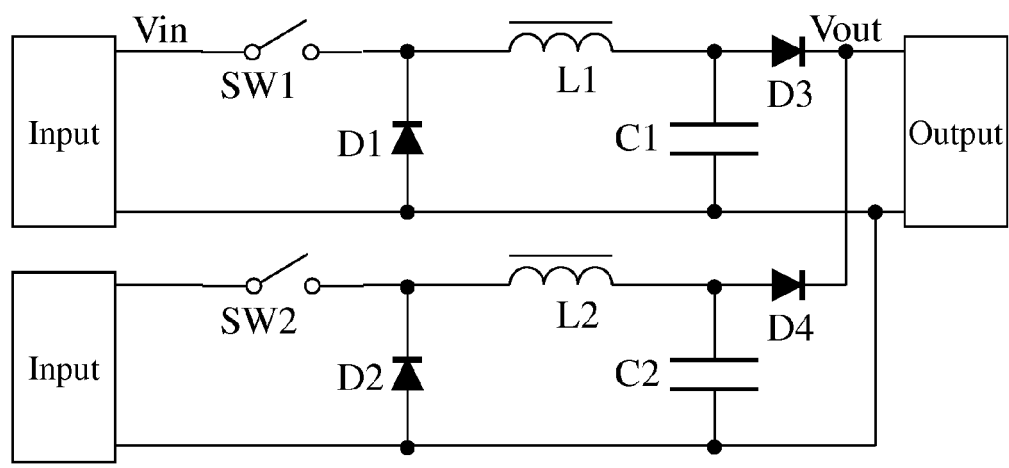
FIG. 25 is an explanatory view (1) explaining an embodiment of the power priority retrieving device using a step-down chopper control circuit (buck converter)

This embodiment will now be explained referring to FIG. 25. FIG. 25 illustrates an embodiment in which a step-down chopper control circuit (buck converter) is used.

Figure 26:
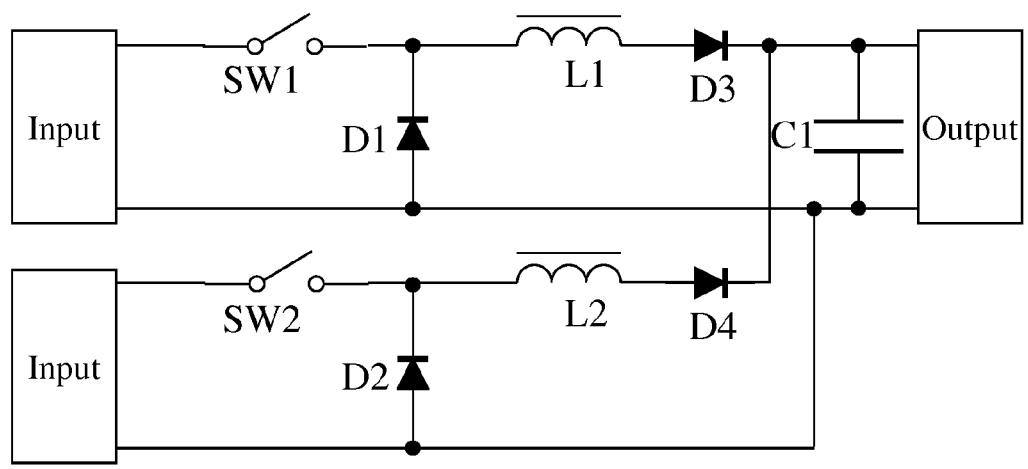
FIG. 26 is an explanatory view (2) explaining an embodiment of the power priority retrieving device using a step-down chopper control circuit (buck converter)

Herein, in FIG. 25, the condenser C1 and the condenser C2 can also be realized with a single shared condenser (FIG. 26), or eliminated depending on an output circuit.

FIG. 25 illustrates an embodiment in which power is controlled such that power priority retrieval can be achieved by the step-down chopper control circuit (buck converter). SW1 and SW2 are switch devices that can be switched at high speed with an external signal, and a FET, transistor, IGBT, and the like can be used. The power supplied to the output (load 5) can be controlled by the ON/OFF switching speed and the ON/OFF time ratio of the switch devices SW1 and SW2.

First, the above-mentioned circuit (SW1-D1-L1-C1 side) will be explained.

If the input voltage was $V_{in}$ and the output voltage was $V_{out}$, when SW1 is switched ON, the voltage applied to L1 becomes $V_{in} - V_{out}$.

From Equation 1, the relationship with the current $I_{on}$ at this time is as follows:

$$Vin - Vout = L_1 \frac{dIon}{dt}. \qquad \text{(Equation 20)}$$

When mutated for $I_{on}$, it becomes:

$$dIon = \frac{Vin - Vout}{L_1} dt. \qquad \text{(Equation 21)}$$

When both sides are integrated with time t, it becomes:

$$Ion = \frac{Vin - Vout}{L_1} t + I_0. \qquad \text{(Equation 22)}$$

$I_0$ is an integration constant, and is the value of the current $I_{on}$ at t=0.

Next, after time to has passed, SW is switched OFF.

The voltage applied to L1 at this time is $0 - V_{out}$. Similarly, the current $I_{off}$ when SW1 is switched OFF is calculated as follows:

$$Ioff = \frac{0 - Vout}{L} t + I_1. \qquad \text{(Equation 23)}$$

$I_1$ is an integration constant, and is the value of the current $I_{off}$ at t=0.

Figure 27:
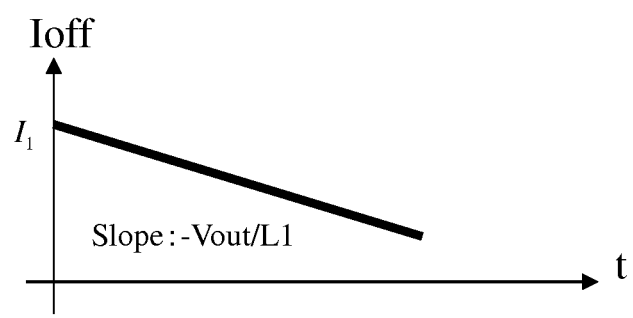
FIG. 27 is an explanatory view explaining a current $I_{off}$ when SW1 is switched OFF in the embodiment of FIG. 26.

A graph of the above is illustrated in FIG. 27.

Figure 28:
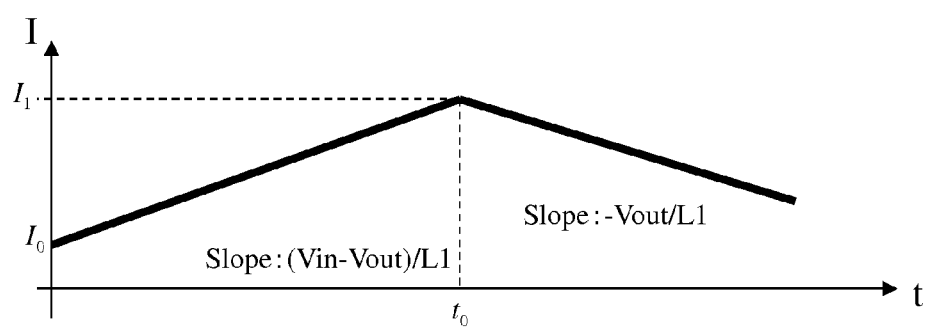
FIG. 28 is an explanatory view explaining a cycle from ON to OFF of SW1 with a graph.

Given the above, a cycle from when the switch SW1 is switched ON until it is switched OFF is constituted in the graph as shown in FIG. 28.

Figure 29:
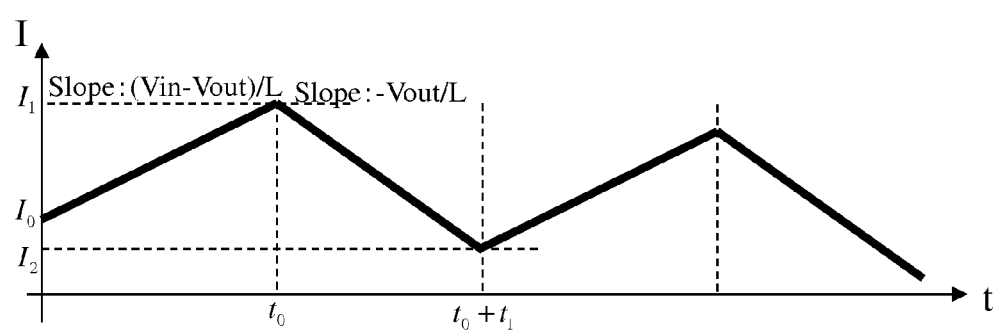
FIG. 29 is an explanatory view (1) explaining a current that flows through L when SW1 is repeatedly switched ON/OFF and this cycle is repeated.

If SW1 is repeatedly switched ON/OFF, this cycle is repeated, and the current that flows through L is as shown in FIG. 29. (The ON time of SW is to, and the OFF time of SW is $t_1$.)

This current is supplied to the output.

An average power P that is supplied to the output over one period is as follows:

$$P = Vout\left(\frac{I_0 + I_1}{2} \frac{t_0}{t_0 + t_1} + \frac{I_1 + I_2}{2} \frac{t_1}{t_0 + t_1}\right). \qquad \text{(Equation 24)}$$

Also, $$I_1 = I_0 + \frac{Vin - Vout}{L} t_0, \qquad \text{(Equation 25)}$$

and $$\begin{aligned} I_2 &= I_1 - \frac{Vout}{L} t_1 \\ &= I_0 + \frac{Vin - Vout}{L} t_0 - \frac{Vout}{L} t_1 \\ &= I_0 + \frac{(Vin - Vout)t_0 - (Vout)t_1}{L}. \end{aligned} \qquad \text{(Equation 26)}$$

Herein, when $I_0 = I_2$, the output current average does not change in each cycle. When $I_0 < I_2$, the output current increases in each cycle, and when $I_0 > I_2$, the output current decreases in each cycle.

When $I_0 = I_2$, $$I_0 = I_0 + \frac{(Vin - Vout)t_0 - (Vout)t_1}{L}. \qquad \text{(Formula 27)}$$

When this is rearranged, $$\frac{t_1}{t_0} = \frac{Vin - Vout}{Vout} \qquad \text{(Formula 28)}$$

Figure 30:
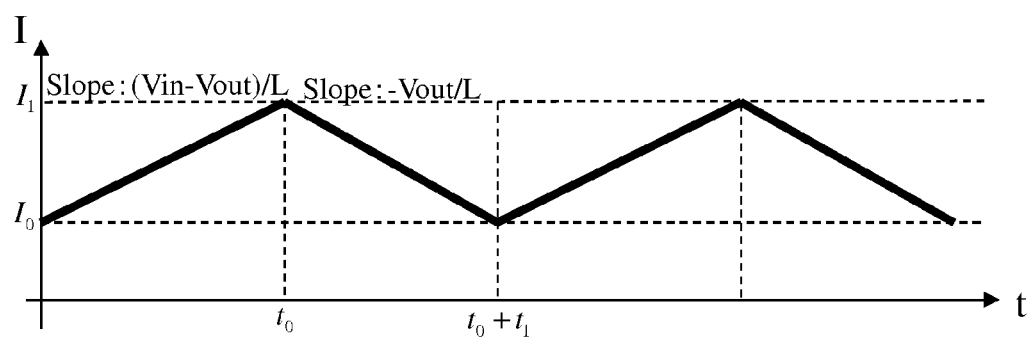
FIG. 30 is an explanatory view (2) explaining a current that flows through L when SW1 is repeatedly switched ON/OFF and this cycle is repeated.

(refer to FIG. 30).

When $I_0 < I_2$, $$I_0 < I_0 + \frac{(Vin - Vout)t_0 - (Vout)t_1}{L}$$

When this is mutated, then:

$$(Vout)t_1 < (Vin - Vout)t_0$$

Therefore, $$\frac{t_1}{t_0} < \frac{Vin - Vout}{Vout}. \quad \text{(Equation 31)}$$

Figure 31:
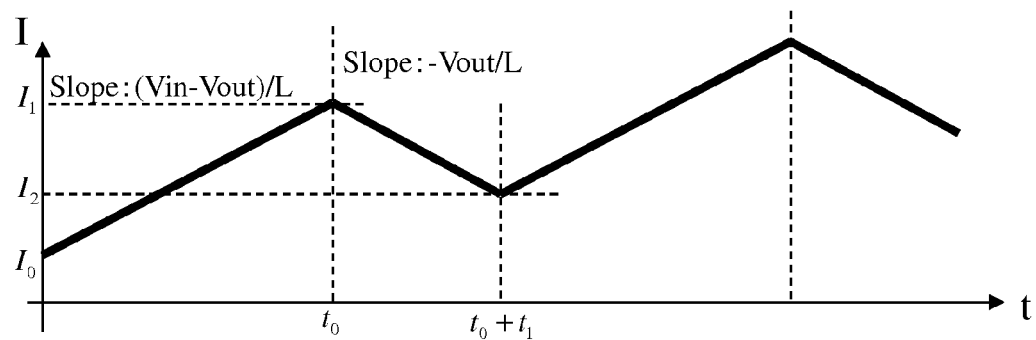
FIG. 31 is an explanatory view (3) explaining a current that flows through L when SW1 is repeatedly switched ON/OFF and this cycle is repeated.

A graph of the above is shown in FIG. 31, and it can be understood that the output current increases.

Similarly, when $I_0 > I_2$, $$\frac{t_1}{t_0} > \frac{Vin - Vout}{Vout}. \quad \text{(Equation 32)}$$

Figure 32:
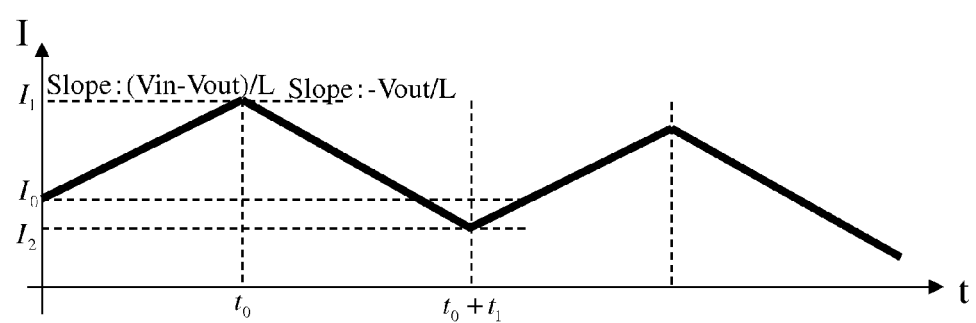
FIG. 32 is an explanatory view (4) explaining a current that flows through L when SW1 is repeatedly switched ON/OFF and this cycle is repeated.

A graph of this is shown in FIG. 32, and it can be understood that the output current decreases.

From Equations 28, 31, and 32, it can be understood that when given a certain $V_{in}$ and $V_{out}$, an increase/decrease of the current that flows to the output can be determined by the ratio of to and $t_1$.

Figure 33:
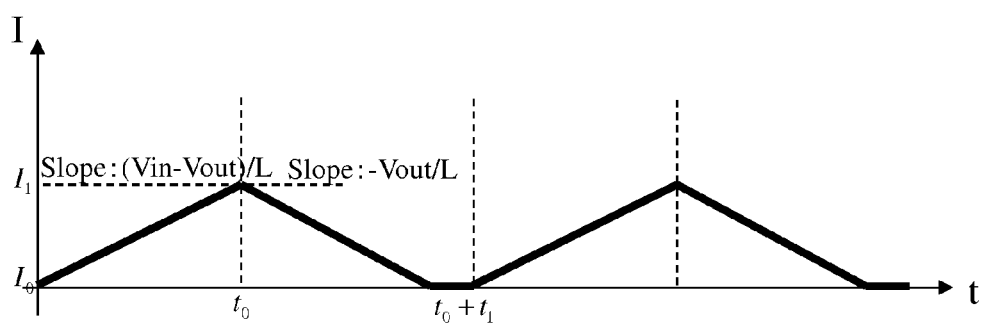
FIG. 33 is an explanatory view (5) explaining a current that flows through L when SW1 is repeatedly switched ON/OFF and this cycle is repeated.

However, when $V_{in} > V_{out}$, even in a state that satisfies Equation 32, or in other words a state in which the output current decreases in each cycle, the current will never become minus. If the current reaches 0 in a certain cycle, the current value at the start of any subsequent cycle will be from 0. A graph of this case is illustrated in FIG. 33.

Figure 34:
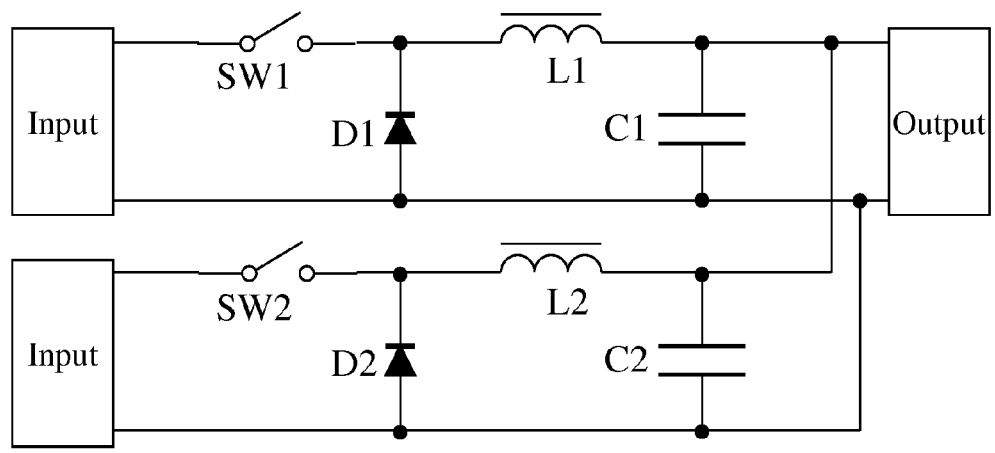
FIG. 34 is an explanatory view (3) explaining an embodiment of the power priority retrieving device using a step-down chopper control circuit (buck converter)

Even in a power priority retrieving device constituted by a step-down chopper control circuit, the backflow prevention diode can be eliminated (FIG. 34) similar to the case of the step-up chopper control circuit.

However, when the input is natural energy (such as a solar panel or a generator) and the power generation amount is small, there are cases in which the input drops below the output voltage. In other words, a case in which $V_{in} < V_{out}$ is also possible. For example, when $V_{in} < V_{out}$ in FIG. 34, backflow can be prevented by avoiding switching SW1 to ON.

Figure 35:
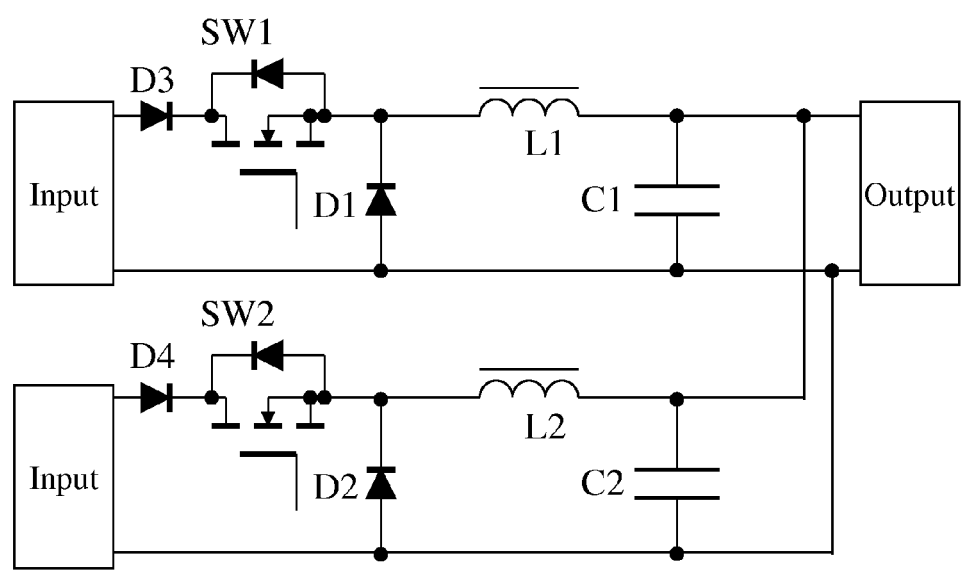
FIG. 35 is an explanatory view (4) explaining an embodiment of the power priority retrieving device using a step-down chopper control circuit (buck converter)

However, if a switch element such as a FET is used for SW1 and SW2, a current flows in the reverse direction due to a parasitic diode. Thus, in this case, backflow prevention diodes or a switching circuit is inserted (D3 and D4 in FIG. 35). These diodes (or switching circuit) can be attached at any position as long as it is within the SW1-L1-output line (or within the SW2-L2-output line). If the direction is reversed, the diodes can be attached on the downside as well.

The above embodiments have all been directed to combining two systems, but 3 or more systems can also be combined in the same manner.

Figure 36:
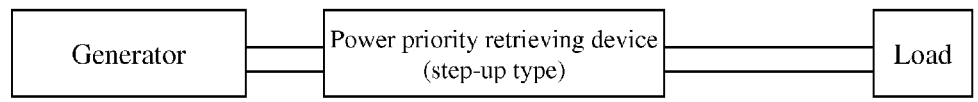
FIG. 36 is an explanatory view explaining a relationship between the power priority retrieving device and the generation-side voltage.
Figure 36:
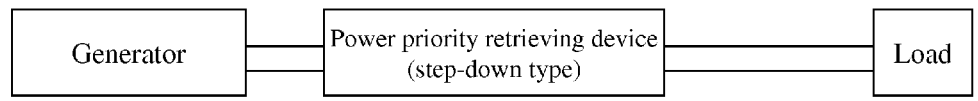
Figure 36:
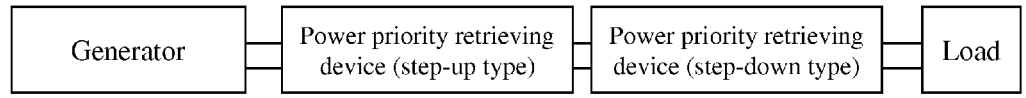

As discussed above, the power priority retrieving device 2 constituted by a step-up chopper control circuit (boost converter) can be used when the voltage on the power generation side is lower than the voltage on the load side (FIG. 36(A)), and the power priority retrieving device 2 constituted by a step-down chopper control circuit (buck converter) can be used when the voltage on the power generation side is higher than the voltage on the load side (FIG. 36(B)).

For example, if the output of the energy source 1 (generator) is configured such that the voltage is low but a large current can be sent, the power priority retrieving device 2 constituted by a step-up chopper control circuit is suitable. Conversely, if the output of the energy source 1 (generator) is configured such that it mainly supplies power with a high voltage, the power priority retrieving device 2 constituted by a step-down chopper control circuit is suitable.

Since there are large fluctuations in the power generation of natural energy, there may be cases in which it cannot be categorically determined whether the voltage on the power generation side is higher or lower than the voltage on the load side. However, in such cases, it is also possible to combine a power priority retrieving device 2 constituted by a step-up chopper control circuit and a power priority retrieving device 2 constituted by a step-down chopper control circuit (a constitutional example of this is shown in FIG. 36(C)).

Figure 37:
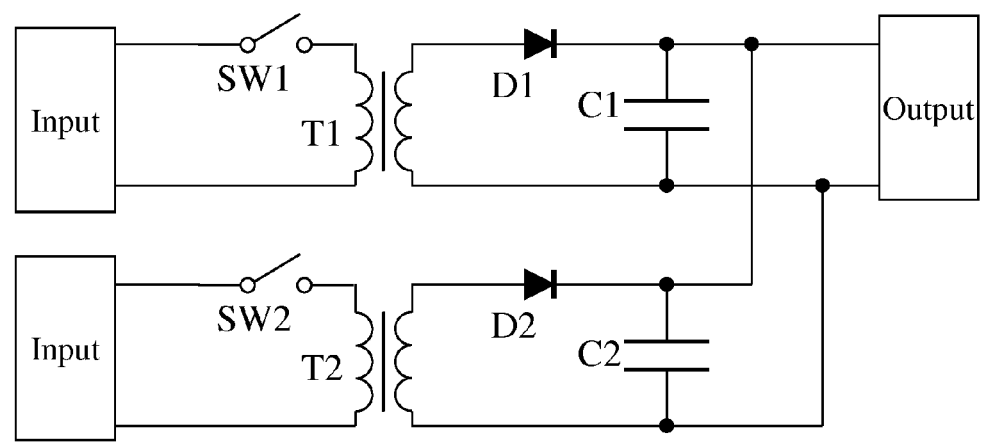
FIG. 37 is an explanatory view explaining an embodiment of the power priority retrieving device using a flyback-type chopper control circuit.

Next, FIG. 37 illustrates an embodiment using a flyback-type chopper control circuit. In this case, similar to FIGS. 25 and 26, the condenser C1 and the condenser C2 can also be realized with a single shared condenser C1, or eliminated depending on an output circuit.

The operation in the case in which the power priority retrieving device 2 is constituted by a flyback-type chopper control circuit is the same as that in the case of a step-up chopper control circuit.

When SW1 is switched ON, a current is sent as in Equation 1 (with the proviso that T1 replaces L), and an induced electromotive force is generated. In the case of the step-up chopper control circuit, a current was directly retrieved from L. However, the case of the flyback-type chopper control circuit differs only in that a current is retrieved from a secondary side of T1.

The diode D1 and the diode D2 are backflow prevention diodes, but a switch element (that can be ON/OFF controlled at high speed with an external signal such as a semiconductor switch like a FET) can be used instead.

The power priority retrieving device 2 constituted by a flyback-type chopper control circuit can be used in a case in which the voltage on the load side is higher than the voltage on the power generation side, and a case in which the voltage on the load side is lower than the voltage on the power generation side.

Figure 38:
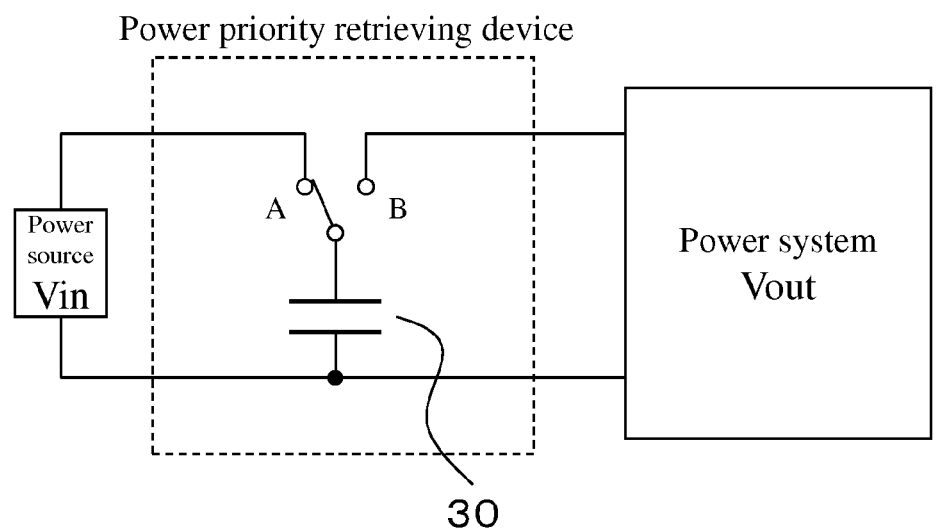
FIG. 38 is an explanatory view (1) explaining an embodiment of the power priority retrieving device using a capacitor.

In the above-described embodiments, a power priority retrieving device 2 using the inductance L was explained. However, a similar operation can also be realized using a capacitor 30. Such an embodiment will now be explained referring to FIG. 38.

In this constitution, the efficiency would deteriorate as compared with a circuit using the inductance L, but this constitution does not use an inductance, and thus it is advantageous in that noise of a type generated by switching of the inductance L is not generated.

In other words, when transmitting power to equipment that is vulnerable to noise, by utilizing the power priority retrieving device 2 using the capacitor 30 according to this embodiment, the effect of noise on the equipment that is vulnerable to noise can be reduced, and thus the operation can be stabilized.

Herein, the capacity of the capacitor (reference numeral 30) is C (F), the voltage of the power source is $V_{in}$, and the voltage of the power system is $V_{out}$.

When the switch is switched to the A side, the capacitor (30) is charged by the $V_{in}$ voltage, and a charge of $C \times V_{in}$ (coulombs) is stored. When the switch is switched to the B side, the voltage on the output side is $V_{out}$, and thus a charge of the potential difference $(V_{out} - V_{in})$, or in other words a charge of $C \times (V_{out} - V_{in})$ (coulombs) is supplied to the power system.

In this case, the power supplied to the power system is determined by the number of times the switch is switched to the A side/B side and the potential difference between the input and output.

Therefore, the amount of power that is supplied can be controlled by the frequency of a signal for switching the switch ON/OFF.

Figure 39:
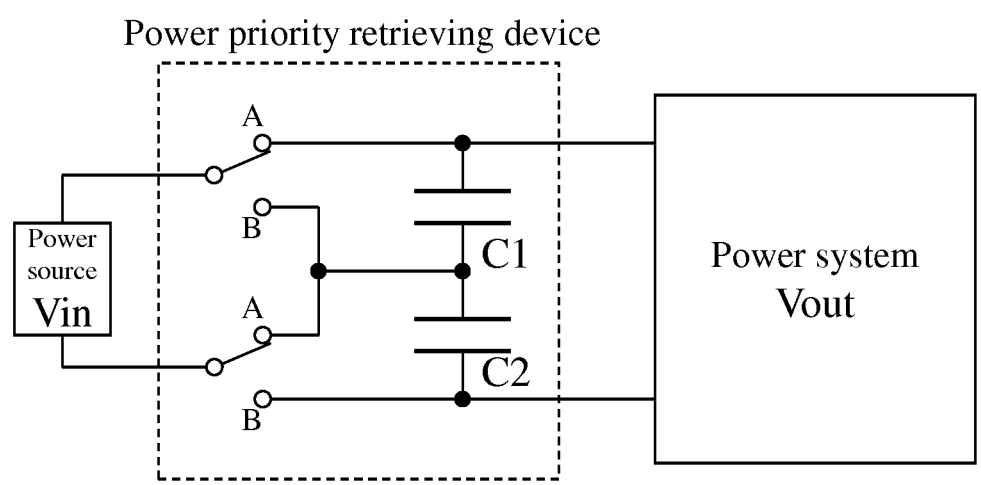
FIG. 39 is an explanatory view (2) explaining an embodiment of the power priority retrieving device using a capacitor.

In this circuit, $V_{in} > V_{out}$ must be satisfied. However, if a circuit like that shown in FIG. 39 is used, power can be supplied within the range of the condition of $2V_{in} > V_{out}$.

Figure 40:
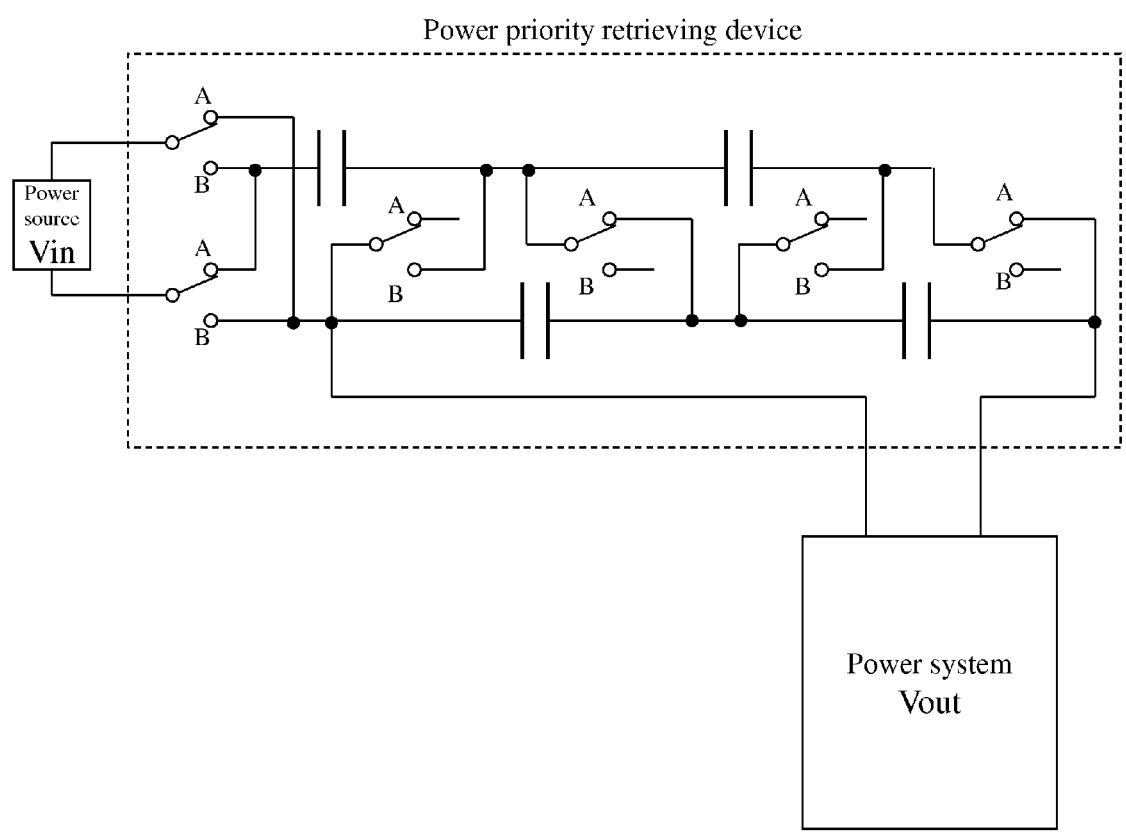
FIG. 40 is an explanatory view (3) explaining an embodiment of the power priority retrieving device using a capacitor.

Similarly, by constituting the circuit as shown in FIG. 40, power can be supplied within the range of the condition of $4V_{in} > V_{out}$.

It has already been explained that by using the power priority retrieving device 2 according to the present invention, power from a natural energy source that is generated by solar photovoltaic generation or the like can be used without waste and without exhaustion.

Also, in the case that the power on the load side using such energy is insufficient with only the power generated by the natural energy source, for example, a DC power source that is rectified from a commercial power source side can be used to compensate only this insufficient portion.

Figure 41:
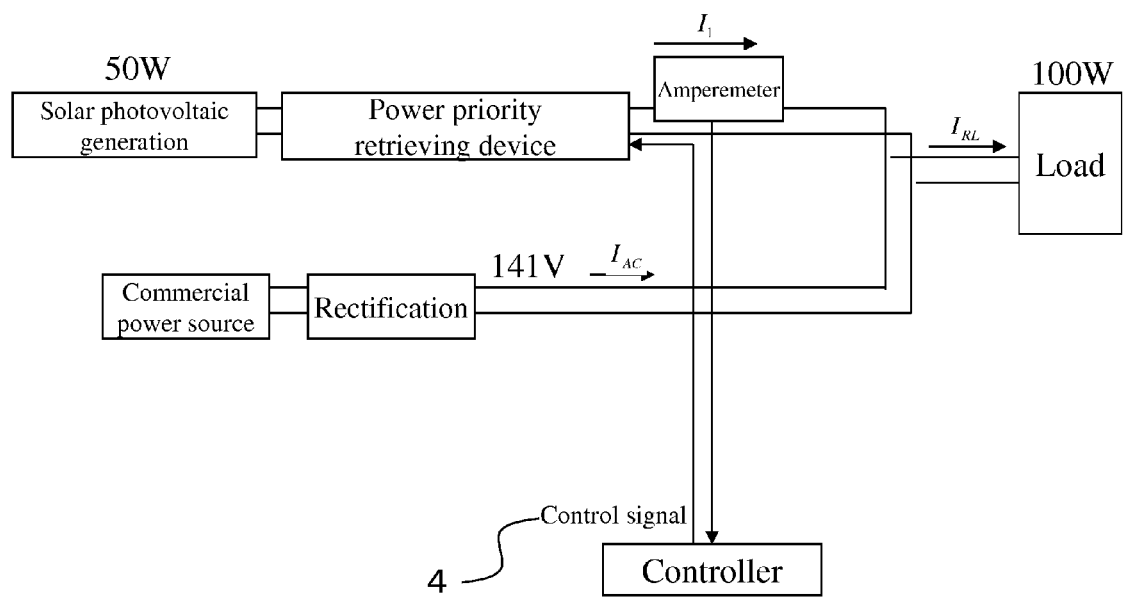
FIG. 41 is an explanatory view (1) explaining a power transmission system developed to retrieve a maximum power at that time of power generated from natural energy that changes due to weather from an energy source which is a solar photovoltaic generator equipped with a power priority retrieving device 2.

An example of this is shown in FIG. 41. For the sake of simplification, the constitution includes a DC power source rectified from the commercial power source and a power source of solar photovoltaic generation (50 W).

Herein, when the current supplied from the solar photovoltaic generation is $I_1$, the current from the commercial power source is $I_{AC}$, and the current flowing to the load is $I_{RL}$, the following equation is established.

$$I_1 + I_{AC} = I_{RL}$$

When substituted in terms of power, it becomes as follows.

$$P_1 + P_{AC} = P_{RL}$$

In the above equation, the power supplied from the solar photovoltaic generation is $P_1$, the power supplied from the commercial power source is $P_{AC}$, and the power supplied to the load is $P_{RL}$.

If the load is 100 W and there is no power generation by solar photovoltaic generation such as during the night, the power to the load is supplied entirely from the commercial power source.

$$P_{AC} = P_{RL} = 100 \text{ W}$$

On the other hand, if a power of 50 W is supplied from the solar photovoltaic generation, $$50 \text{ W} + P_{AC} = 100 \text{ W}$$

Therein, $P_{AC}$ becomes 50 W.

In this way, the power supplied from the commercial power source is only an amount (insufficient portion) obtained by subtracting the amount supplied from the solar photovoltaic generation from the load power. Similar results have been obtained from actual experimentation.

Next, a power transmission system developed to retrieve a maximum power at that time of power generated from natural energy that changes due to weather from an energy source 1 which is a solar photovoltaic generator equipped with the power priority retrieving device 2 of the present invention will be explained.

In solar photovoltaic generation, the output voltage changes greatly due to changes in the weather and load fluctuations.

In a solar cell, the voltage reaches a maximum ($V_{pv}$) when there is no load, and when a load is applied, the voltage drops.

When there is no load, the current is 0, and the power at this time is $V_{pv} \times 0 = 0$, and thus the power is 0. Further, if the output of the solar cell is short circuited, the current reaches a maximum but the voltage is 0V. Thus, the power retrieved at this time is also 0.

Figure 42:
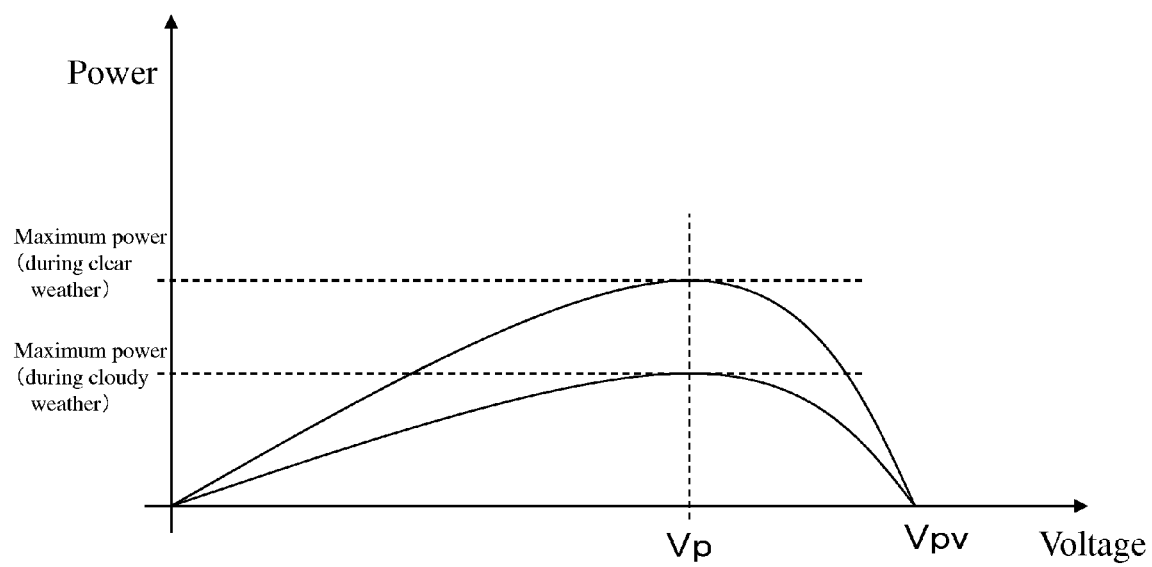
FIG. 42 is an explanatory view (2) explaining a power transmission system developed to retrieve a maximum power at that time of power generated from natural energy that changes due to weather from an energy source which is a solar photovoltaic generator equipped with a power priority retrieving device 2.

Between a voltage of 0 to $V_{pv}$, there is a voltage at which the power that can be retrieved reaches a maximum (this voltage will be regarded as $V_p$). The relationship between the power that can be retrieved from the solar photovoltaic generation and the voltage can be represented as shown in FIG. 42.

If the amount of sunshine is low, such as during cloudy weather, the generated power is reduced compared to during clear weather. However, similar to during clear weather, there is a voltage at which the power that can be retrieved reaches a maximum between a voltage of 0 to $V_{pv}$ (the lower curve in FIG. 42).

In order to retrieve power with maximum efficiency with solar photovoltaic generation, a method in which the output of the solar photovoltaic generation is measured with a power meter and then the load is adjusted such that the output reaches a maximum (for example, a hill-climbing method) is generally used.

The configuration example shown in FIG. 41 will now be explained. Since the power of the solar photovoltaic generation can be modified by the control signal 4 of the power priority retrieving device 2, a maximum output can be obtained by adjusting the control signal 4.

Figure 43:
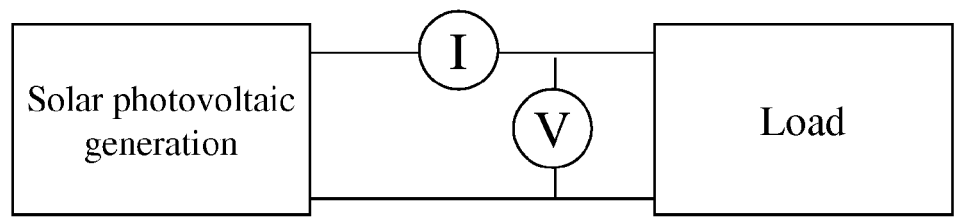
FIG. 43 is an explanatory view (3) explaining a power transmission system developed to retrieve a maximum power at that time of power generated from natural energy that changes due to weather from an energy source which is a solar photovoltaic generator equipped with a power priority retrieving device 2.

In general, in order to measure power, it is necessary to measure the voltage and the current (FIG. 43). The product of the current and the voltage at this time is the power.

However, in the system using the power priority retrieving device 2 shown in FIG. 41, instead of measuring the power, the output current $I_1$ can be observed, and thus it is not necessary to measure the current and voltage of the solar panel and calculate the product thereof (in FIG. 41, only the measured value of the amperemeter is measured with the controller 3).

Figure 44:
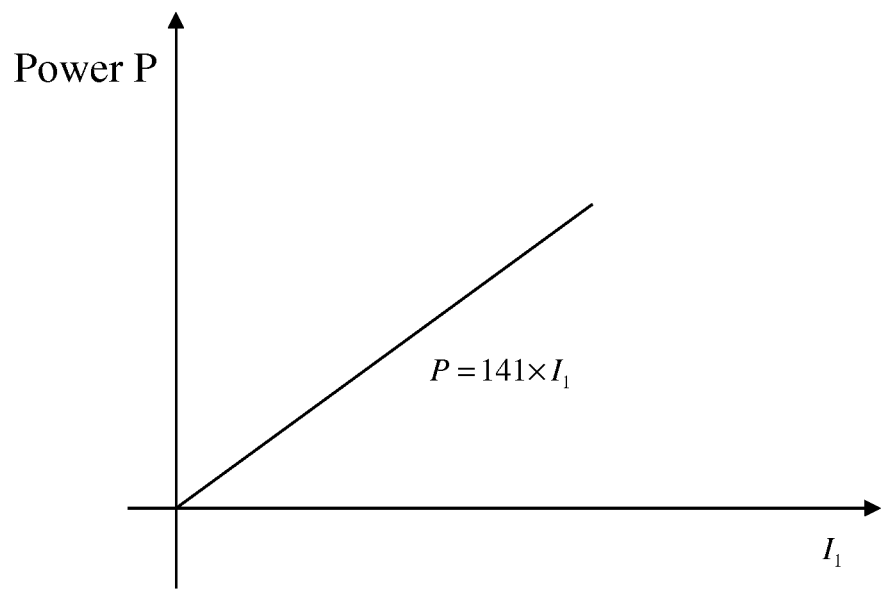
FIG. 44 is an explanatory view (4) explaining a power transmission system developed to retrieve a maximum power at that time of power generated from natural energy that changes due to weather from an energy source which is a solar photovoltaic generator equipped with a power priority retrieving device 2.

This is because the voltage in the output of the power priority retrieving device is determined with the voltage on the commercial power source side (141V in this example) (if the commercial power source has sufficient capacity, the voltage will not drop even if the load is increased), and thus the power P becomes a value proportional to the current value $I_1$ as shown in Equation C below (FIG. 44).

$$P = 141 \times I_1 \quad \text{(Equation C)}$$

Therefore, when the output current $I_1$ is detected and it reaches a maximum value, the control signal 4 of the power priority retrieving device 2 is adjusted so that a maximum output of the power from the solar photovoltaic generator can be obtained.

BRIEF EXPLANATION OF REFERENCE NUMERALS

1: energy source
2: power priority retrieving device
3: controller
4: control signal
5: load
6: voltage detecting device
30: capacitor

What is claimed is:

1. A power transmission system comprising:

a plurality of DC power sources;

a load that receives a supply of power from the plurality of DC power sources;

a plurality of power priority retrieving devices connected between the plurality of DC power sources and the load, each power priority retrieving device including switching elements and each power priority retrieving device being connected to a different one of the plurality of DC power sources for outputting the power supplied by the connected DC power source to the load; and a controller that determines an amount of power to be provided from each of the power priority retrieving devices, and provides a control signal to each of the power priority retrieving devices for controlling a length of time of an ON state and a length of time of an OFF state of the switching elements in each of the power priority retrieving device so as to control the amount of power to be supplied to the load from each of the plurality of DC power sources, wherein the amount of power from each of the power priority retrieving devices determined by the controller is combined after being output by each of the power priority retrieving devices and the combined power is transmitted to the load regardless of a voltage value of the power of each amount of power that has been determined and without using a backflow prevention diode between each of the power priority retrieving devices and the load, and on the load side, power resulting from the combination of the amount of power provided from each of the power priority retrieving devices is received by the load.

2. The power transmission system according to claim 1, wherein an output-side current value of a power priority retrieving device is detected, and by using the detected current value, a maximum efficiency power generation amount at that time is determined for a power generation amount of a solar photovoltaic power generation device, which is one energy source to which the power priority retrieval device is attached.

3. The power transmission system according to claim 2, wherein the power priority retrieval device is configured to include a capacitor.

4. The power transmission system according to claim 1, wherein the power priority retrieval device is configured to include a capacitor.

5. A power transmission system comprising:

a plurality of DC power sources; and a load that receives a supply of power from the plurality of DC power sources, a plurality of power priority retrieving devices connected between the plurality of DC power sources and the load, each power priority retrieving device including switching elements and each power priority retrieving device being connected to a different one of the plurality of DC power sources for outputting the power supplied by the connected DC power source to the load; and a controller that determines an amount of power to be provided from each of the power priority retrieving devices, and provides a control signal to each of the power priority retrieving devices for controlling a length of time of an ON state and a length of time of an OFF state of the switching elements in each of the power priority retrieving device so as to control the amount of power to be supplied to the load from each of the plurality of DC power sources wherein the amount of power from each of the power priority retrieving devices determined by the controller is combined after being output by each of the power priority retrieving devices and the combined power is transmitted to the load regardless of a voltage value of the power of each amount of power that has been determined and without using a backflow prevention diode between each of the power priority retrieving devices and the load, on the load side, power resulting from the combination of the amount of power provided from each of the power priority retrieving devices is received by the load, and each power priority retrieving device includes at least one of a step-up chopper control circuit and a step-down chopper control circuit to control the amount of power to be supplied to the load from each DC power source, and the controller uses a control signal as part of a pulse width modulation control method that adjusts a width ratio of a pulse signal representing an ON time and a pulse signal representing an OFF time of the switching elements in each of the power priority retrieving devices so as to control the amount of power to be transmitted to the load from each of the power priority retrieving devices.

6. The power transmission system according to claim 5, wherein an output-side current value of a power priority retrieving device is detected, and by using the detected current value, a maximum efficiency power generation amount at that time is determined for a power generation amount of a solar photovoltaic power generation device, which is one energy source to which the power priority retrieval device is attached.

7. The power transmission system according to claim 6, wherein the power priority retrieval device is configured to include a capacitor.

8. The power transmission system according to claim 5, wherein the power priority retrieval device is configured to include a capacitor.

* * * * *